United States Patent
Kim et al.

(10) Patent No.: US 8,659,478 B2
(45) Date of Patent: Feb. 25, 2014

(54) WIRELESS POSITIONING METHOD, WIRELESS POSITIONING APPARATUS, AND MOBILE STATION

(75) Inventors: Kanghee Kim, Daejeon (KR); Geon Min Yeo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 210 days.

(21) Appl. No.: 13/005,282

(22) Filed: Jan. 12, 2011

(65) Prior Publication Data

US 2011/0171993 A1 Jul. 14, 2011

(30) Foreign Application Priority Data

Jan. 13, 2010 (KR) .................. 10-2010-0002940
Jan. 12, 2011 (KR) .................. 10-2011-0003140

(51) Int. Cl.
*G01S 5/02* (2010.01)
(52) U.S. Cl.
USPC ....................... 342/464; 342/451; 342/458
(58) Field of Classification Search
USPC ............. 342/451, 458, 464; 455/456.1–456.6
See application file for complete search history.

(56) References Cited

U.S. PATENT DOCUMENTS

| 6,256,506 B1 * | 7/2001 | Alexander et al. .......... 455/456.4 |
| 6,362,783 B1 * | 3/2002 | Sugiura et al. ................ 342/457 |
| 2006/0240845 A1 * | 10/2006 | Feuerstein et al. ......... 455/456.1 |

FOREIGN PATENT DOCUMENTS

| KR | 2002-0094736 | 12/2002 |
| KR | 10-2010-0037532 | 4/2010 |
| WO | WO/2010/038998 | 4/2010 |

* cited by examiner

*Primary Examiner* — Cassie Galt
(74) *Attorney, Agent, or Firm* — Staas & Halsey LLP (57) ABSTRACT

A wireless positioning apparatus receives a plurality of channel responses for a plurality of locations, generates a plurality of channel response patterns from the plurality of channel responses, and stores the plurality of channel response patterns. The wireless positioning apparatus receives an estimated channel response from a mobile station and compares the estimated channel response with the plurality of channel response patterns to estimate a location of the mobile station. The wireless positioning apparatus provides the estimated location information to the mobile station.

8 Claims, 7 Drawing Sheets

WIRELESS POSITIONING METHOD, WIRELESS POSITIONING APPARATUS, AND MOBILE STATION

CROSS-REFERENCE TO RELATED APPLICATION

This application claims priority to and the benefit of Korean Patent Application No. 10-2010-0002940 filed in the Korean Intellectual Property Office on Jan. 13, 2010, and 10-2011-0003140 filed in the Korean Intellectual Property Office on Jan. 12, 2011, the entire contents of which are incorporated herein by reference.

BACKGROUND OF THE INVENTION (a) Field of the Invention

The present invention relates to a wireless positioning method, a wireless positioning apparatus and a mobile station. More particularly, the present invention relates to a wireless positioning method for improving positioning accuracy.

(b) Description of the Related Art

For the wireless positioning method in wireless communication environment, there are many technologies such as time of arrival (TOA), time difference of arrival (TDOA), angle of arrival (AOA), delay spread of arrive (DSOA), and FingerPrint. The FingerPrint provides positioning means by dividing a region into small areas of the same size or small areas of the different size, and then by storing characteristics on a wireless communication system of each area into database.

Unlike the conventional communication environment which can utilize various sorts of system information, the recent wideband mobile communication is developing in direction of minimizing inter-cell interference and guaranteeing transmission speed at cell boundaries. Also, as the frequency reuse coefficient becomes bigger, the overlapped area during cell design decreases. Therefore, in such designed cells, it is not easy to obtain sufficient system information such as adjacent cell information, and adjacent cell SINR (Signal to Interference-plus-Noise Ratio) distribution. In this case, the positioning accuracy can sharply decrease.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a wireless positioning method, a wireless positioning apparatus and a mobile station for improving positioning accuracy.

An exemplary embodiment of the present invention provides a wireless positioning method of a wireless positioning apparatus, comprising: obtaining a plurality of channel response patterns for a plurality of locations; storing the plurality of channel response patterns in connection with the plurality of locations; and estimating a location based on the plurality of channel response patterns.

Estimating the location can comprise: receiving an estimated channel response from a mobile station; and comparing the estimated channel response with the plurality of channel response pattern to estimate the location of the mobile station.

The wireless positioning method can further comprise: providing the estimated location information to the mobile station.

Obtaining the plurality of channel response patterns can comprise: receiving the plurality of channel responses for the plurality of locations; and generating the plurality of channel response patterns using the plurality of channel responses.

Generating the plurality of channel response patterns can comprise: accumulating the plurality of channel response patterns corresponding to at least one of the plurality of locations to generate a channel response pattern for the at least one of the plurality of locations.

Accumulating the plurality of channel response patterns can comprise: assigning weight values to the plurality of channel response pattern to generate the channel response pattern for the at least one of the plurality of locations.

Generating the plurality of channel response patterns can comprise: grouping information within a predetermined time tap of a channel response corresponding to at least one of the plurality of locations to extract characteristics; and generating the channel response pattern for the at least one of the plurality of locations based on the characteristics.

Generating the plurality of channel response patterns can comprise: normalizing samples of a channel response corresponding to at least one of the plurality of locations to generate the channel response pattern for the at least one of the plurality of locations.

Another embodiment of the present invention provides a wireless positioning method of a wireless positioning apparatus, comprising: receiving an estimated channel response from mobile station; and estimating a location of the mobile station by using the estimated channel response.

Estimating the location of the mobile station can comprise: comparing the estimated channel response with a plurality of channel response patterns for a plurality of locations to estimate the location of the mobile station.

Comparing the estimated channel response can comprise: measuring a signal attenuation from the estimated channel response; and estimating a distance based on the signal attenuation.

Comparing the estimated channel response further comprises: measuring at least one of a delay and a delay spread from the estimated channel response; and comparing the at least one of the delay and the delay spread with the plurality of channel response patterns to estimate the location of the mobile station.

The wireless positioning method can further comprise: transmitting an estimated location information to the mobile station.

The wireless positioning method can further comprise: receiving, from the mobile station, at least one of a serving cell's base station identifier, adjacent cells' base station identifiers, sector information, preamble index, RSSI, SINR, and handover information.

Comparing the estimated channel response can comprise: estimating the location of the mobile station by further using the at least one of a serving cell's base station identifier, adjacent cells' base station identifiers, sector information, preamble index, RSSI, SINR, and handover information.

Yet another embodiment of the present invention provides a mobile station, comprising: a channel estimator for estimating a channel response; a transmitter for transmitting an estimated channel response to a wireless positioning apparatus; and a receiver for receiving, from the wireless positioning apparatus, location information that is estimated based on the estimated channel response.

The location information can correspond to information that is estimated by comparing the estimated channel response with a plurality of channel response patterns for a plurality of locations.

Another embodiment of the present invention provides a wireless positioning apparatus, comprising: a first receiver for receiving a plurality of channel responses for a plurality of locations; a pattern generator for generating a plurality of channel response patterns from the plurality of channel responses; a second receiver for receiving an estimated channel response from a mobile station; and a location estimator for comparing the estimated channel response with the plurality of channel response patterns to estimate a location of the mobile station.

The wireless positioning apparatus can further comprise: a first transmitter for providing an estimated location information to the mobile station.

The wireless positioning apparatus can further comprise: a second transmitter for transmitting a reference signal used for channel response estimation.

The location estimator can measure a signal attenuation, a delay, and a delay spread from the estimated channel response, estimates a distance based on the signal attenuation, and compares at least one of the delay and the delay spread with the plurality of channel response patterns to estimate the location of the mobile station.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

In this specification, a mobile station (MS) may designate a terminal, a mobile terminal (MT), a subscriber station (SS), a portable subscriber station (PSS), user equipment (UE), an access terminal (AT), etc., and may include the entire or partial functions of the mobile terminal, the subscriber station, the portable subscriber station, the user equipment, etc.

In this specification, a base station (BS) may designate an access point (AP), a radio access station (RAS), a Node B, a base transceiver station (BTS), a mobile multihop relay (MMR)-BS, etc., and may include the entire or partial functions of the access point, the radio access station, the node B, the base transceiver station, the MMR-BS, etc.

Next, referring to drawings, components and operation of a wireless positioning apparatus and a mobile station according to an exemplary embodiment of the present invention will be described.

Figure 1:
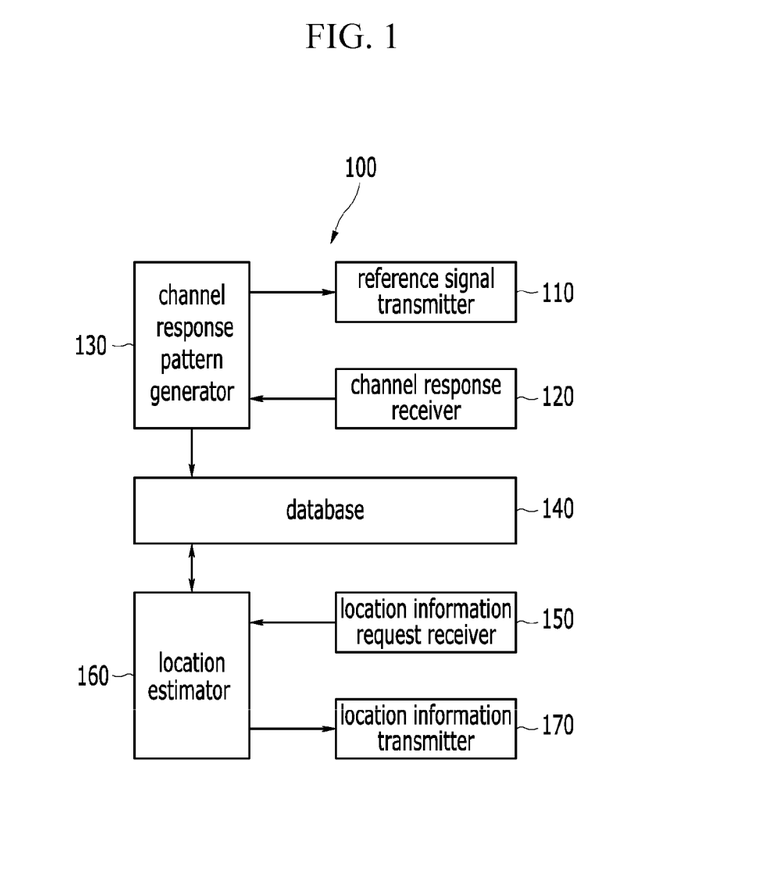
FIG. 1 shows a block diagram of a wireless positioning apparatus according to an exemplary embodiment of the present invention.

FIG. 1 shows a block diagram of a wireless positioning apparatus according to an exemplary embodiment of the present invention.

As shown in FIG. 1, the wireless positioning apparatus 100 according to an exemplary embodiment of the present invention comprises a reference signal transmitter 110, a channel response receiver 120, a channel response pattern generator 130, a database 140, a location information request receiver 150, a location estimator 160 and a location information provider 170. The wireless positioning apparatus 100 may be one component of the base station or may be a separate device from the base station. If the wireless positioning apparatus 100 is a separate device from the base station, the wireless positioning apparatus 100 may directly communicate with the mobile station, and may communicate with the mobile station via the base station.

The reference signal transmitter 110 transmits a reference signal for estimating a channel response. The channel response receiver 120 receives channel responses of plural locations. The channel response pattern generator 130 generates a channel response pattern by using a channel response of each location. The database 140 stores channel response patterns for the plural locations. The location information request receiver 150 receives, form the mobile station, location information request message including a estimated channel response. The location estimator 160 estimates a location of the mobile station by using information within location information request message which is received from the mobile station. The location information transmitter 170 transmits estimated location information to the mobile station.

Figure 2:
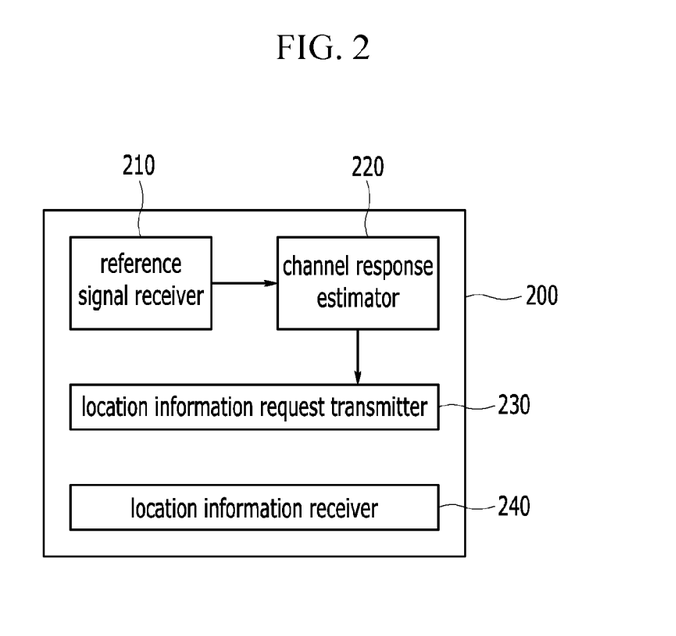
FIG. 2 shows a block diagram of a mobile station according to an exemplary embodiment of the present invention.

FIG. 2 shows a block diagram of a mobile station according to an exemplary embodiment of the present invention.

As shown in FIG. 2, the mobile station 200 according to an exemplary embodiment of the present invention comprises a reference signal receiver 210, a channel response estimator 220, a location information request transmitter 230, and a location information receiver 240.

The reference signal receiver 210 receives a reference signal via a channel. The channel response estimator 220 estimates a channel response from a received reference signal. The location information request transmitter 230 transmits a location information request message including an estimated channel response to the wireless positioning apparatus 100. The location information receiver 240 receives estimated location information from the wireless positioning apparatus 100.

Figure 3:
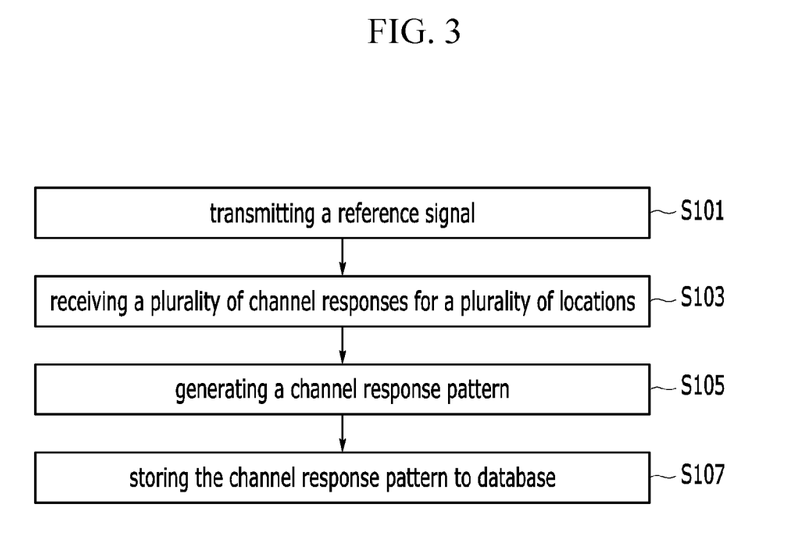
FIG. 3 is a flowchart showing wireless positioning information collecting method according to an exemplary embodiment of the present invention.

FIG. 3 is a flowchart showing wireless positioning information collecting method according to an exemplary embodiment of the present invention.

In order to collect wireless positioning information, reference signal transmitter 110 transmits a reference signal in step S101. The reference signal may be an impulse signal.

And then, the channel response receiver 120 receives channel responses from receivers located in plural locations in step S103.

Next, referring to FIG. 4 to FIG. 6, the channel response according to an exemplary embodiment of the present invention will be described.

Figure 4:
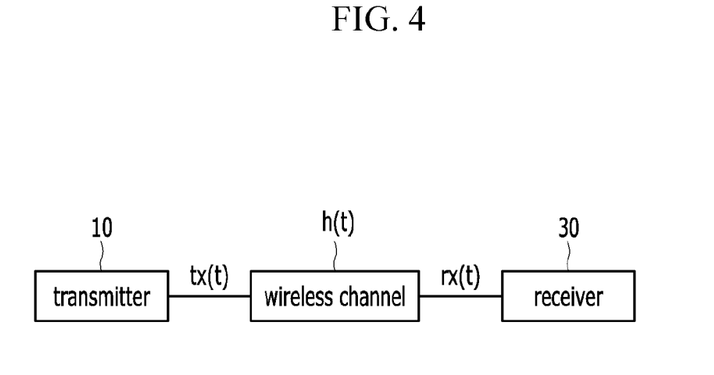
FIG. 4 shows a wireless transceiver system according to an exemplary embodiment of the present invention.

FIG. 4 shows a wireless transceiver system according to an exemplary embodiment of the present invention.

As shown in FIG. 4, wireless transceiver system comprises a transmitter 10, a radio channel h(t), and a receiver 30.

A signal rx(t) which the receiver 30 receives can be described by a model that a signal tx(t) is transmitted by the transmitter 10 through the radio channel h(t). In linear system, the radio channel h(t) can be described in form of the tap delay. As the bandwidth of the communication system becomes wider, the estimation resolution of radio channel h(t) has been improved.

Figure 5:
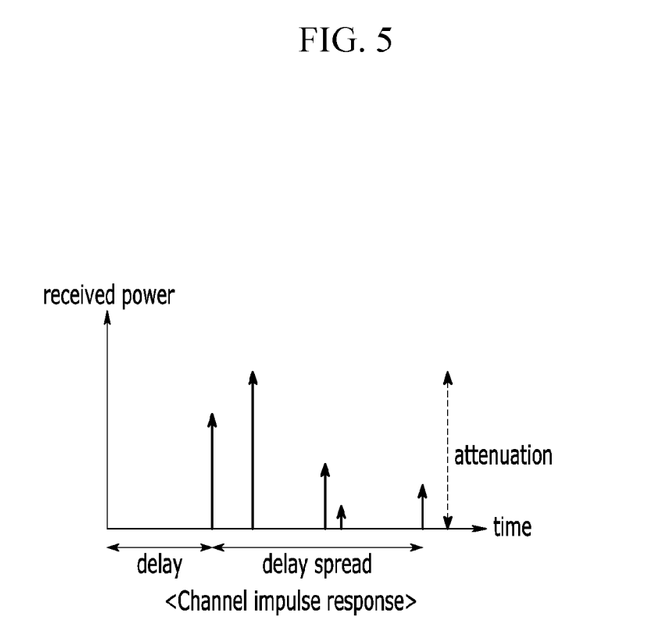
FIG. 5 shows a radio channel measurement result in form of tap delay according to an exemplary embodiment of the present invention.

FIG. 5 shows a radio channel measurement result in form of tap delay according to an exemplary embodiment of the present invention.

As shown in FIG. 5, a channel impulse response corresponding to the radio channel measurement result includes three basic variation elements of microwave, namely attenuation, time delay, and delay spread. These three basic variation elements can become a characteristic for each location. Also, these can be numerically made into database.

Figure 6:
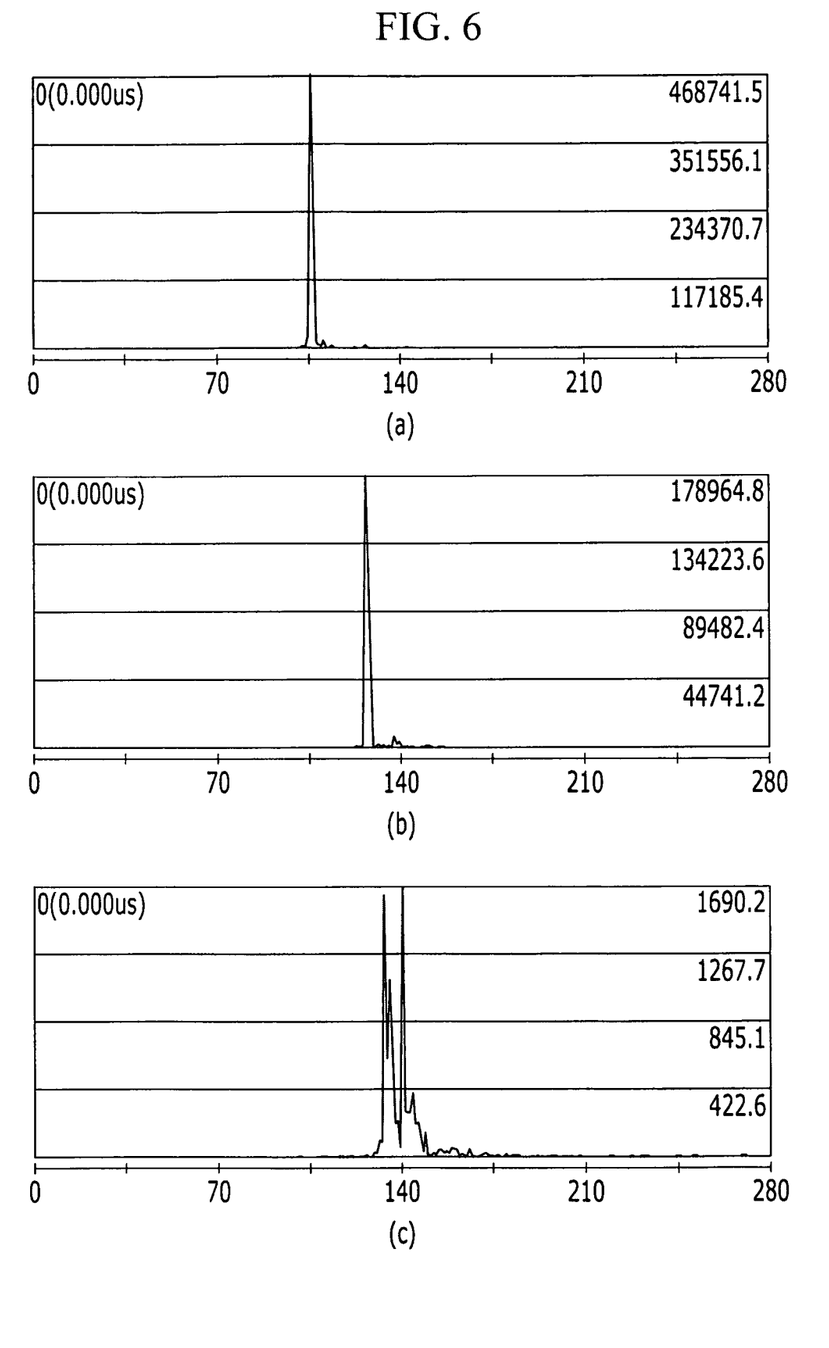
FIG. 6 shows radio channel measurement results in different locations according to an exemplary embodiment of the present invention.

FIG. 6 shows radio channel measurement results in different locations according to an exemplary embodiment of the present invention.

As shown in FIG. 6, channel responses in different locations can have distinctive patterns according to the locations. Therefore, the channel response can be used for positioning.

FIG. 3 will be described again.

For each of plural locations, the channel response pattern generator 130 generates a channel response pattern by using the received channel response in step S105. For each of plural locations, the channel response pattern generator 130 may generate a channel response pattern by accumulating a plurality of channel responses with consideration for fast fading. Also, for each of plural locations, the channel response pattern generator 130 assigns weight values to a plurality of channel responses to generate the channel response pattern. In addition, the channel response pattern generator 130 groups channel response information within a predetermined time tap and extracts characteristics such as the peak value and the slope from a group to generate the channel response pattern. For each of plural locations, the channel response pattern generator 130 normalizes samples of different SINRs or different RSSI (received signal strength indication) levels to generate the channel response pattern. According to another exemplary embodiment of the present invention, instead of generating the channel response pattern by the wireless positioning apparatus 100, receiver or the mobile station 200 may generate the channel response pattern to provide it to the wireless positioning apparatus 100.

The channel response pattern generator 130 stores the channel response patterns for plural locations into the database 140 in step S107. The Channel response pattern generator 130 may store time distribution, magnitude, ratio, etc. of the channel response pattern for each of plural locations into The database 140. Particularly, because the channel response pattern includes information on attenuation, time delay, and delay spread of a signal, these parts of information can be used as parameters for estimating the location.

Next, referring to FIG. 7, a wireless positioning method according to an exemplary embodiment of the present invention will be described.

Figure 7:
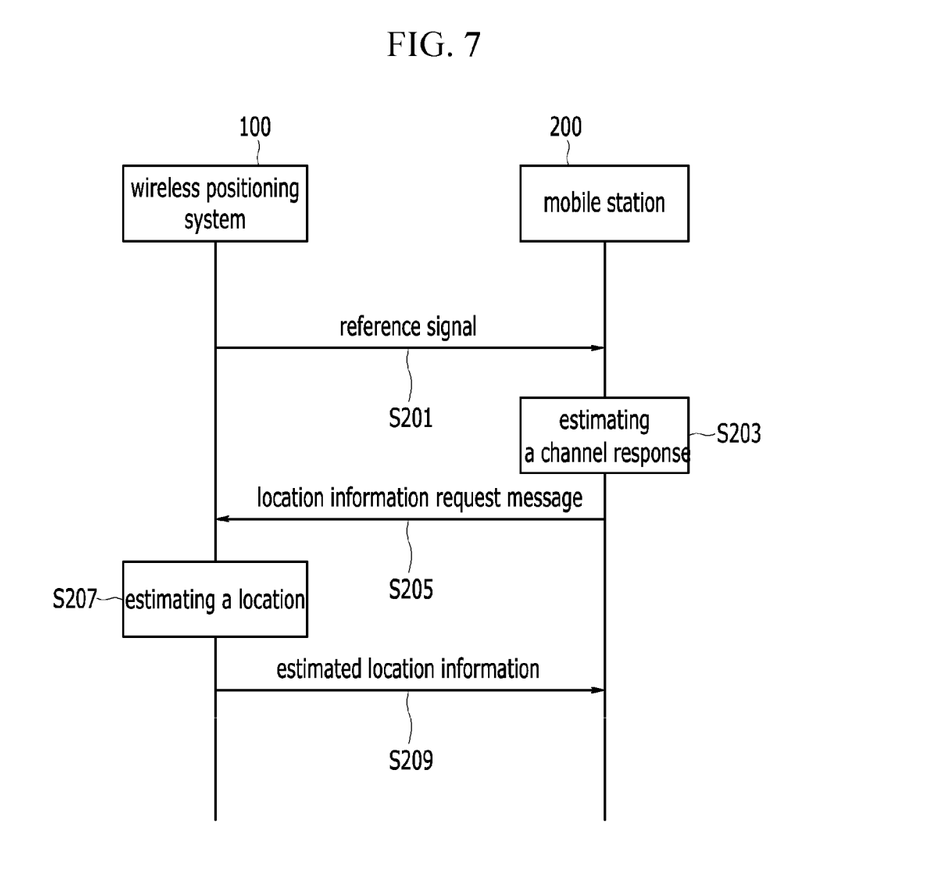
FIG. 7 is a flowchart representing a wireless positioning method according to an exemplary embodiment of the present invention.

FIG. 7 is a flowchart representing a wireless positioning method according to an exemplary embodiment of the present invention.

First, the wireless positioning apparatus 100 transmits a reference signal to the mobile station 200 in step S201.

The mobile station 200 estimates a channel response from the received reference signal in step S203.

After this, the mobile station 200 transmits a location information request message including the estimated channel response to the wireless positioning apparatus 100 in step S205. The location information request message further includes some or all of a serving cell's base station identifier, adjacent cells' base station identifiers, sector information, preamble index, RSSI, SINR, and handover information.

The wireless positioning apparatus 100 queries, to the database 140, a location in connection with the most similar information to information within the received location information request message to estimate the queried location as a location of the mobile station 200 in step S207. Concretely, the wireless positioning apparatus 100 may compare a channel response received from the mobile station 200 with a plurality of channel response patterns within the database 140 to estimate a location in connection with the most similar channel response pattern to the received channel response as a location of the mobile station 200. Also, the wireless positioning apparatus 100 can estimate a distance of the mobile station 200 by using the signal attenuation obtained from the received channel response, and can estimate a location of the mobile station 200 by using some or all of the delay, the delay spread, and the pattern which are obtained from the received channel response. In addition, the wireless positioning apparatus 100 can estimate a location of the mobile station 200 by further using some or all of a serving cell's base station identifier, adjacent cells' base station identifiers, sector information, preamble index, RSSI, SINR, and handover information.

After estimating the location, the wireless positioning apparatus 100 transmits the estimated location information to the mobile station 200 in step S209.

According to aspects of the present invention, the positioning accuracy can be improved by using characteristics of the radio channel and the wireless positioning system can be simplified. The wireless positioning system with the improved positioning accuracy can activate various location-based services.

The exemplary embodiments of the present invention are not implemented only by a device and/or method, but can be implemented through a program for realizing functions corresponding to the configuration of the exemplary embodiments of the present invention and a recording medium having the program recorded thereon. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A wireless positioning method of a wireless positioning apparatus, comprising:

receiving a plurality of channel responses for a plurality of locations, each channel response including signal attenuation, time delay, and delay spread as characteristics for the respective location;

generating a plurality of channel response patterns using the plurality of channel responses, the generating including grouping information within a predetermined time tap of a channel response corresponding to at least one of the plurality of locations to extract peak value and slope from a respective group and generating the channel response pattern for the at least one of the plurality of locations based on the peak value and slope;

storing in a memory the plurality of channel response patterns in connection with the plurality of locations; and estimating a location based on the plurality of channel response patterns, wherein each of the receiving, generating, storing, and estimating are performed by one or more processors.

2. The wireless positioning method of claim 1, wherein estimating the location comprises:

receiving an estimated channel response from a mobile station; and comparing the estimated channel response with the plurality of channel response patterns to provide an estimated location information of the mobile station.

3. The wireless positioning method of claim 2, further comprising:

providing the estimated location information to the mobile station.

4. The wireless positioning method of claim 1, wherein accumulating the plurality of channel response patterns further comprises:

assigning weight values to the plurality of channel response pattern to generate the channel response patterns for the at least one of the plurality of locations.

5. The wireless positioning method of claim 1, wherein generating the plurality of channel response patterns further comprises:

normalizing samples of a channel response corresponding to at least one of the plurality of locations to generate the channel response pattern for the at least one of the plurality of locations.

6. A wireless positioning apparatus, comprising:

a first receiver configured to receive a plurality of channel responses for a plurality of locations, each channel response including signal attenuation, time delay, and delay spread as characteristics for the respective location;

a pattern generator configured to generate a plurality of channel response patterns from the plurality of channel responses, and to group information within a predetermined time tap of a channel response corresponding to at least one of the plurality of locations to extract peak value and slope from a respective group and to generate the channel response pattern for the at least one of the plurality of locations based on the peak value and slope;

a second receiver configured to receive an estimated channel response from a mobile station; and a location estimator configured to compare the estimated channel response with the plurality of channel response patterns to estimate a location of the mobile station.

7. The wireless positioning apparatus of claim 6, further comprising:

a first transmitter configured to provide an estimated location information to the mobile station.

8. The wireless positioning apparatus of claim 7, further comprising:

a second transmitter configured to transmit a reference signal used for channel response estimation.

* * * * *